US007587366B2

(12) United States Patent
Grim, III et al.

(10) Patent No.: US 7,587,366 B2
(45) Date of Patent: Sep. 8, 2009

(54) SECURE INFORMATION VAULT, EXCHANGE AND PROCESSING SYSTEM AND METHOD

(75) Inventors: Clifton Grim, III, Seabrook, TX (US); Christopher I. Schmidt, Friendswood, TX (US); John D. Wilson, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 10/965,592

(22) Filed: Oct. 14, 2004

(65) Prior Publication Data

US 2006/0085344 A1 Apr. 20, 2006

(51) Int. Cl.
*G06Q 30/00* (2006.01)

(52) U.S. Cl. .............................. 705/51; 705/44; 705/52; 705/53

(58) Field of Classification Search .................... 705/51
See application file for complete search history.

(56) References Cited

U.S. PATENT DOCUMENTS

| | | | |
|---|---|---|---|
| 5,426,281 A | | 6/1995 | Abecassis |
| 5,892,900 A | * | 4/1999 | Ginter et al. .................. 726/26 |
| 5,910,988 A | | 6/1999 | Ballard |
| 6,105,131 A | * | 8/2000 | Carroll ........................ 713/155 |
| 6,141,423 A | | 10/2000 | Fischer |
| 6,182,050 B1 | | 1/2001 | Ballard |
| 6,216,229 B1 | | 4/2001 | Fischer |
| 6,247,127 B1 | | 6/2001 | Vandergeest |
| 6,298,348 B1 | | 10/2001 | Eldering |
| 6,324,650 B1 | | 11/2001 | Ogilvie |
| 6,334,109 B1 | | 12/2001 | Kanevsky et al. |
| 6,438,690 B1 | * | 8/2002 | Patel et al. ................... 713/156 |
| 6,954,753 B1 | | 10/2005 | Jeran |

(Continued)

FOREIGN PATENT DOCUMENTS

WO 02/29516 4/2002

(Continued)

OTHER PUBLICATIONS

F. Bastani, et al., "A High-Assurance Measurement Repository System", Proceedings. Fifth IEEE International Symposium on High Assurance Systems Engineering (HASE 2000), pp. 265-272.

(Continued)

*Primary Examiner*—James P Trammell
*Assistant Examiner*—Hai Tran
(74) *Attorney, Agent, or Firm*—William E. Scheisser; Greenblum & Bernstein P.L.C.

(57) ABSTRACT

A system and method for providing an information vault so that individual owners of personal data may control and manage the access and dissemination of the personal data and provides for the owner of the personal data to receive compensation for the use of the personal data, thus, in effect, the personal data becomes a valuable commodity analogous to money. A business model is provided that allows competitive, unbiased trusted third parties whose business is protecting the information analogous to how a commercial bank protects money. Centralized protected storage of personal data is provided, thereby minimizing the number of copies that may be in existence. Second party access to the centralized storage of personal data may be made on-demand, as required for commerce, with a provision for assessing fees for accesses.

39 Claims, 14 Drawing Sheets

U.S. PATENT DOCUMENTS

| | | |
|---|---|---|
| 6,993,326 B2 | 1/2006 | Link et al. |
| 7,013,388 B2 | 3/2006 | Fisk et al. |
| 2002/0107027 A1 | 8/2002 | O'Neil |
| 2002/0107803 A1* | 8/2002 | Lisanke et al. ............... 705/51 |
| 2002/0112153 A1 | 8/2002 | Wu et al. |
| 2002/0112162 A1* | 8/2002 | Cocotis et al. ............. 713/176 |
| 2003/0079133 A1 | 4/2003 | Breiter et al. |
| 2003/0191716 A1 | 10/2003 | Woods et al. |
| 2003/0204447 A1* | 10/2003 | Dalzell et al. ............... 705/26 |
| 2003/0225693 A1 | 12/2003 | Ballard et al. |
| 2004/0221920 A1 | 11/2004 | Ferguson et al. |
| 2006/0085254 A1 | 4/2006 | Grim, III et al. |
| 2006/0085344 A1 | 4/2006 | Grim, III et al. |

OTHER PUBLICATIONS

S. Ye, et al., "SCENS: a System for the Mediated Sharing of Sensitive Data", Proceedings of the 2003 Joint Conference on Digital Libraries.

Karen Seo, et al., "Public-Key Infrastructure for the Secure Border Gateway Protocol (S-BGP)", IEEE, 2001, pp. 239-253.

Srdjan Capkun, et al., "Mobility Helps Security in Ad Hoc Networks", MobiHoc 2003, pp. 46-56.

Lidong Zhou, et al., "COCA: A Secure Distributed Online Certification Authority", ACM Transactions on Computer Systems, vol. 20, No. 4, Nov. 2002, pp. 329-368.

* cited by examiner

SECURE INFORMATION VAULT, EXCHANGE AND PROCESSING SYSTEM AND METHOD

BACKGROUND OF THE INVENTION

1. Field of the Invention

The invention generally relates to a system and method for an information vault and, more particularly, to a system and method for an information vault and controlling access to the information vault.

2. Background Description

As the world becomes more wired and electronic storage becomes cheaper than the cost of paper, the protection of information becomes paramount. The ease with which information can be copied and propagated causes serious information privacy issues. Keeping information safe and secure is thus one of the biggest issues facing the information technology (IT) industry today.

There are several areas of concern regarding the protection of information including the danger of unrecoverable loss of the information itself and defense against unauthorized copying of the digital information. Also, the control of access to the information may pose certain risk factors to the owner of the information and to the thousands of other organizations who hold copies of this information for business reasons. Ultimately, there may be a potential loss of financial opportunity based on the use of the information.

Unrecoverable loss of data is familiar to nearly everyone. Important documents, images, and financial information are frequently lost not only for individuals but small organizations as well as large. Unrecoverable loss may undermine a business' future to continue or operate.

Further, unauthorized replication of information is a serious problem and may be illustrated with the notion of information theft of credit card numbers. While it is unlikely that the illicit copying of digital objects may be completely eradicated, original access to personal information needs to be controlled tighter. For example, access to medical records, credit card and other financial information needs to be managed so that privacy is maintained more rigorously. Additionally, the transit of this personal information needs to be protected as well as facilitated, such as, the passing of credit card and transaction information, medical records, and the like.

Each business that holds private and personal information supposedly has a responsibility to protect that information and typically builds an infrastructure to protect the information from compromise. The level of management and protection of information and, in particular, personal information, is becoming a legislated issue with governments passing laws requiring organizations to notify the information owners when the privacy of the information may have been compromised. Organizations typically must inform users how they ensure that key information remains private and how they affect disclosure.

Also, business processes (e.g., charging, shipping) as performed today, require customers to provide these businesses with their personal financial and address information and often other information to complete the transactions. Once provided to the business, it may be vulnerable to compromise and not all businesses can apply appropriate resources to protect it.

Ultimately, information is valuable. The illicit use of information could cause a financial loss to the owner or confer an unfair advantage to another party. For example, organizations collect personal information and preferences and sell them on the open market as phone lists, market research, or the like. The individual who owns this information (i.e., the person themselves) never gets directly or indirectly compensated. Instead, the information compilers or middlemen essentially take an individual's information and sell the information. Not only does the individual not get compensated for the middlemen's and advertisers' use of the information but are also indiscriminately solicited or spammed as a result.

Typically, the current common solution involves each "second party", i.e., the entities an individual may give personal information to, "to promise" via privacy policies that are long and difficult to read, to not compromise or sell information. It is common knowledge that these policies are then either ignored or having been slyly worded, the private personal information is shared with others. Or, the private information is merely stolen by outsiders or insiders at any of the thousands of entities that store personal information.

Examples of attempts to address information privacy issues include Microsoft® Corporation which has implemented a centralized, single sign on/authentication service called Passport which may store your private information and provide it only to web sites that have agreed to certain privacy agreements. Microsoft also has tried to implement Hailstorm, a centralized storage system with charges for people to store their data. The Liberty Alliance project is another example effort to provide similar single sign on specifications that vendors may provide.

Also, American Express has implemented a "Private Payment" service where a user obtains a special card number (requested in real-time by a user at the Amex web site) to use for a web purchase so that no one ever sees an individual's real card number. This number looks like an Amex card number and has an expiration date of a month or so.

However, each of these implementations has not addressed allowing an owner of the information to control access to the personal data and to enable value to flow to the owner of the personal information.

SUMMARY OF THE INVENTION

In an aspect of the invention a secure information repository system is provided. The system comprises data storage for securely storing encrypted information associated with an account holder and a deposit system for securely depositing encrypted information into the data storage. The system also comprises an information access system for accessing the encrypted information stored in the data storage, an information withdrawal system for removing the encrypted information stored in the data storage and a tracking system for logging a deposit to the data storage, a withdrawal from the data storage, a deletion to the data storage, an account creation, an account deletion or an access to the data storage.

In another aspect of the invention a system for a protected information repository is provided. The system comprises an information vault having data storage. The information vault comprises a means for securely creating an account in the information vault, a means for securely depositing information in the information vault, a means for accessing information in the information vault and a means for charging for transactional activity involving the information.

In another aspect of the invention, a method of providing an information repository is provided. The method comprises accessing an information vault to perform a transaction involving a secured item of information stored in the information vault, authenticating an identity of an entity performing the accessing, executing the transaction when the identity of the entity is authenticated and logging the transaction.

In another aspect of the invention, a method of charging for personal information is provided. The method comprises depositing personal data by an owner into an information vault, establishing a contract with at least one entity and the owner to enable access to the personal data by the at least one entity, accessing the personal data by the at least one entity according to terms of the contract and charging a fee for accessing the personal data.

In another aspect of the invention, a computer program product comprising a computer usable medium having readable program code embodied in the medium is provided. The computer program product includes at least one component to access an information vault to perform a transaction involving a secured item of information stored in the information vault, authenticate an identity of an entity performing the accessing, execute the transaction when the identity of the entity is authenticated and log the transaction.

DETAILED DESCRIPTION OF EMBODIMENTS OF THE INVENTION

This invention is, generally, in one embodiment, directed to a system and method for providing an information vault so that individual owners of personal data may control and manage the access and dissemination of the personal data. The system and method also provides for the owner of the personal data to receive compensation for the use of the personal data, thus, in effect, the personal data becomes a valuable commodity analogous to money. The invention provides a business model that allows competitive, unbiased trusted third parties whose business is protecting the information analogous to how a commercial bank protects money.

To this end, the system and method of the invention provides a trusted storage of personal data, thereby minimizing the number of copies that may be in existence. Second party access to the trusted storage of personal data may be made on-demand, as required for commerce, with a process for assessing fees for accesses.

Figure 1:
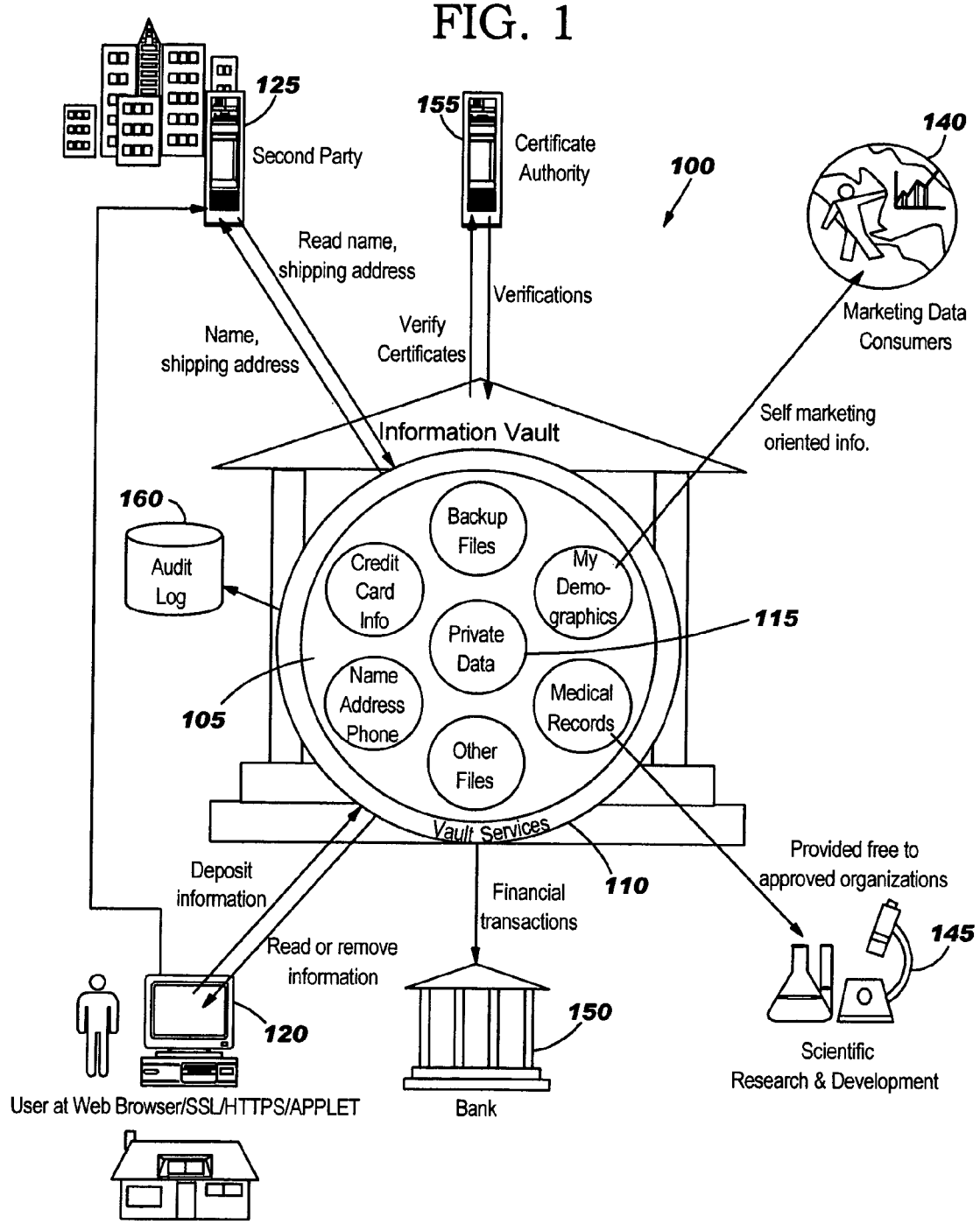
FIG. 1 is an exemplary overview of an embodiment of the invention.

FIG. 1 is an exemplary overview of an embodiment of the invention. An "Information Vault", generally denoted by reference numeral 100, provides for an information infrastructure patterned somewhat after the currency model of the world's financial infrastructure, for example. The vault 100 employs current data storage 105 and security technologies to provide a secure storage mechanism for user's information, such as for example, name, address, phone numbers, medical records, credit card information, demographic information, or similar personal data. Certain information may be encrypted by the owner to make the data totally private, even from the vault, as denoted by reference numeral 115. A computer system 120 (e.g., a personal computer) may be employed by a user to read or remove information from the vault or to deposit information to the vault.

A set of services 110 are provided, built on the vault's secure storage, to allow users to create accounts, deposit information in any form, and read or remove the information. Information may be stored in the vault encrypted by the vault and optionally, users may encrypt the information with their own private key.

In addition, vault services 110 are provided to allow a user to specify conditions, in a secure way via technologies of the existing Public Key Infrastructure (PKI), so that a second party 125 may have read access to certain, sharable portions of the user's information. All accesses typically use the first and second party's public keys as identification. To share information with a second party, a contract data token specifying the two parties' public keys may be created and digitally signed by the first party's private key to ensure that access to private information is not propagated beyond the second party. This feature of the invention allows a migration away from the current approach of users providing second party entities (e.g. online web merchants) their personal information and thereafter compelled to trust the merchants to securely protect the information from compromise.

With this invention's approach, the user provides the second party 125 permission to read an agreed upon set of personal information. As the information is thereafter always available to the second party (at least until cancellation or recasting of the contract), there is no longer any need for the second party to store the user's personal information within its own databases. As a trusted third party for information, then, the information vault 100 significantly contributes to the elimination of the escalating dangers of identity theft.

The system may also allow second parties to request certain processing or services which may significantly eliminate the need for the second party 125 to ever see the personal information of the first party. Provision is also made in the system for a user to specify personal information (e.g., my consumer preferences and demographics) that the vault may make publicly available for commercial purposes such as marketing data consumers 140, with proceeds going to the user/owner, or otherwise, made publicly available for free for charitable or scientific purposes 145.

FIG. 1 shows that the invention is based on, and does not replace, the financial network for payments (e.g., banking 150) for information vault services or Certificate Authorities 155 of the PKI for certificate and key verifications. The interface to the bank 150 may include interfaces to financial networks for debits and payments for vault transactions and services. The invention may also provide audit logs 160 of transactions.

The invention, therefore, establishes the concept of information as "money" or "currency" itself. This implies that an information repository may be built that is modeled on a financial bank. Information may be deposited, withdrawn, shared, processed upon and protected in a safety deposit box. Additionally, the information, itself, may be used to generate income.

To this end, as described above and in more detail below, the invention is capable of providing underlying technology and business processes for providing an information vault, exchange and processing system that include in embodiments:

- a technique that allows information to be deposited in the vault;
- a controlled access method to remove this information from the vault;
- an intermediary service so that information may be effectively escrowed and then delivered to the appropriate party as needed as opposed to requiring the second party to store the information locally;
- a method to track consumers of certain information sets;
- an infrastructure that allows certain classes of information to generate income for the owner;
- a dual key safety deposit box for information such that only a specified party will be able to gain access;
- the ability to allow the repository to perform certain functions on the data of one or more parties;
- the technique and method to financially charge for the above services.

Figure 2:
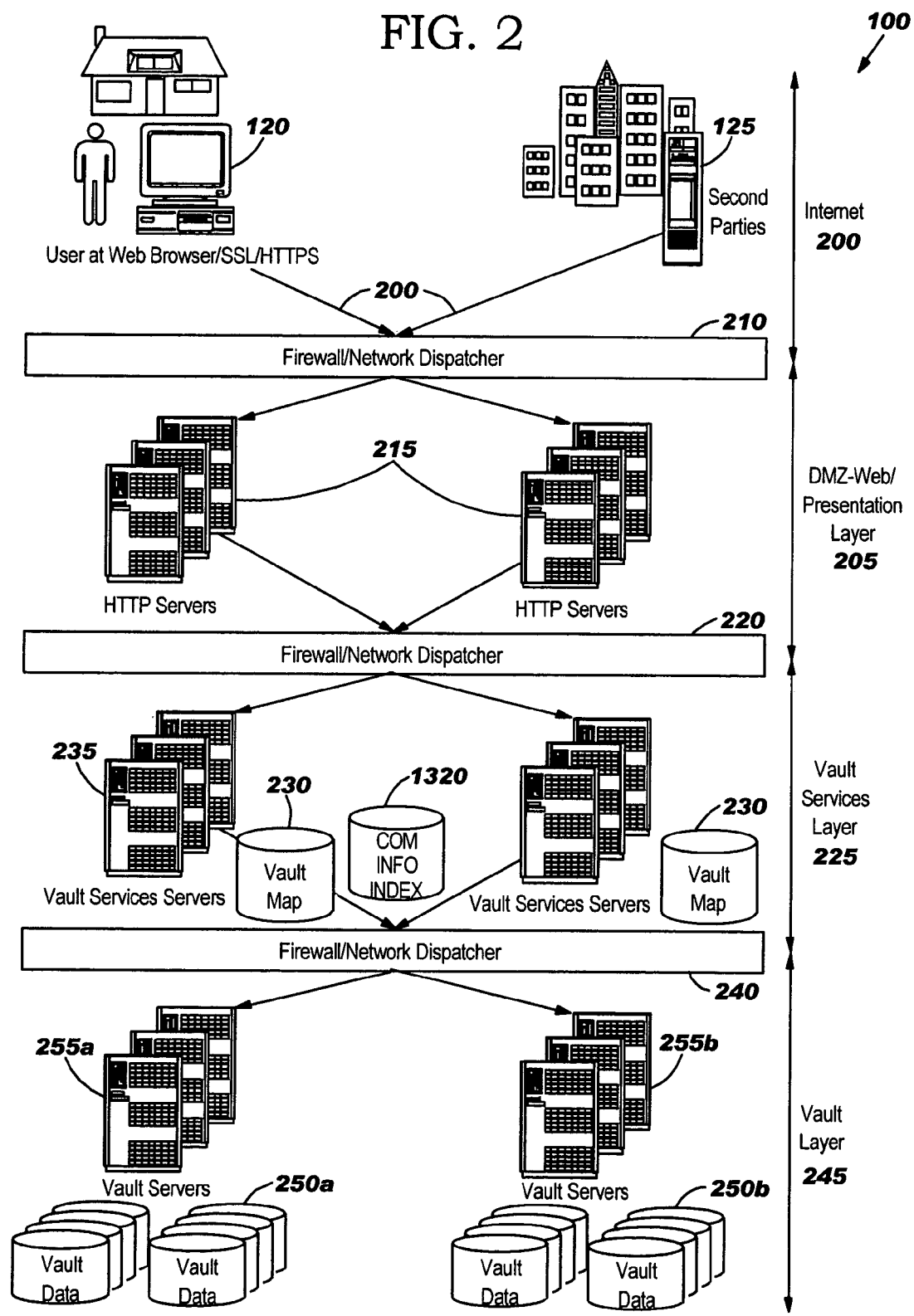
FIG. 2 is a block diagram of an embodiment of a physical information vault architecture.

FIG. 2 is a block diagram of an embodiment of a physical information vault architecture. The Information Vault 100 comprises a typical three tier networking architecture. A user, via user computer 120, and second party or parties 125 may access the Information Vault 100 with a secure connection over the Internet 200 or similar connection The first tier layer 205 facing the open network is the DMZ (i.e., popularly referred to as the "demilitarized zone") or presentation tier. This layer sits behind a firewall/network dispatcher 210 and includes multiple HTTP Servers 215, possibly geographically separated for high availability reasons. This first tier layer 205 accepts requests from outside users and provides presentation level services for the requests. Service requests are passed on to the application services layer of the vault services.

Another firewall/network dispatcher 220 may be placed between the DMZ 205 and the vault services layer 225. The vault services layer 225 handles the business logic for the system, as described below. One or more databases 230 within the layer keep metadata and a mapping between uses and their associated information. When a service server 235 needs to retrieve information, a request is made through a third firewall/network dispatcher 240 to the Vault Layer 245. The Vault Layer 245 may be a highly redundant set of storage areas 250a and 250b, typically geographically separated. In addition, data may be sliced across the separated servers 255a and 255b so that no single compromise of security may provide access to user information. Other data security technologies may be applied to the information vault 100 in order to ensure integrity, as would be known to one of ordinary skill in the art.

Figure 3:
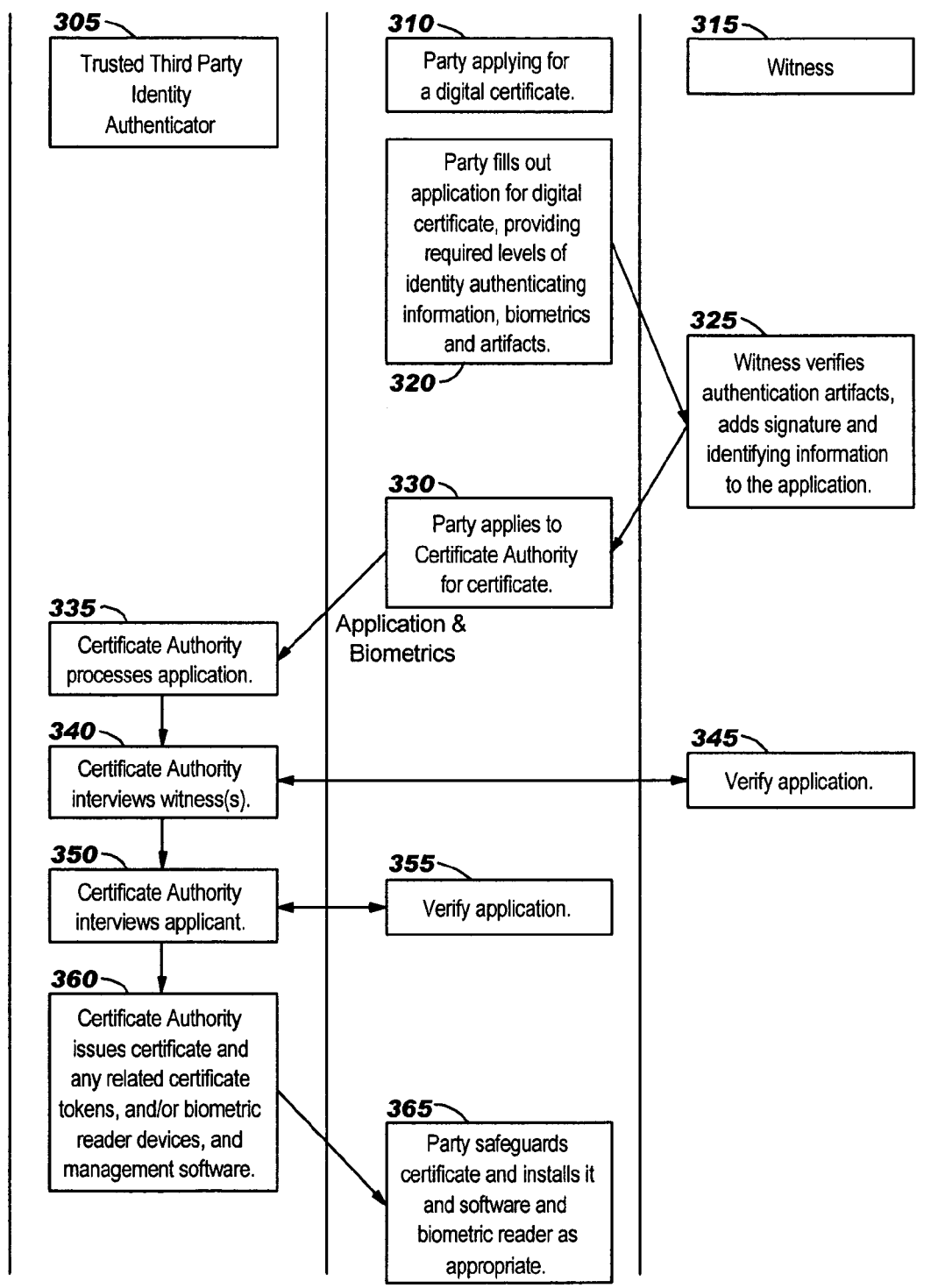
FIG. 3 is a swim lane diagram showing steps of an embodiment of a digital certificate creation.

FIG. 3 is a swim lane diagram showing steps of an embodiment of a digital certificate creation. "Swim lane" diagrams may be used to show the relationship between the various "actors" in the processes and to define the steps involved in the processes. FIG. 3 (and all the other swim lane Figures) may equally represent a high-level block diagram of components of the invention implementing the steps thereof. The steps of FIG. 3 (and all the other Figures employing swim lane diagrams) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. The steps of FIG. 3 (and the other swim lane Figures) may also be implemented by the embodiments of FIGS. 1 and 2.

Referring to FIG. 3, three swim lanes are shown including a lane for Trusted Third Party Identity Authenticator 305 (e.g., certificate authority 155), a lane for the party applying (applicant) for a digital certificate 310, and a lane for a witness 315. At step 320, the applicant completes an application for a digital certificate providing any number of identity authenticating information predetermined by the vault provider, such as biometrics, personal information (e.g., name, address, age, financial data, date of birth, or the like) and artifacts.

At step 325, a witness(es) verifies the authentication artifacts and adds a signature and witness identification to the application. At step 330, the applicant applies to a certificate authority (e.g., certificate authority 155) for a certificate. At step 335, the certificate authority processes the application and checks for completeness. At step 340, the certificate authority interviews the witness(es) and at step 345 the witness(es) verify the application.

At step 350, the certificate authority interviews the applicant and at step 310, the applicant verifies the application. At step 360, the certificate authority issues a certificate and related certificate tokens and/or biometric reader devices, and management software. At step 365, the applicant safeguards the certificate and installs the certificate, management software, and biometric reader, as appropriate.

Figure 4:
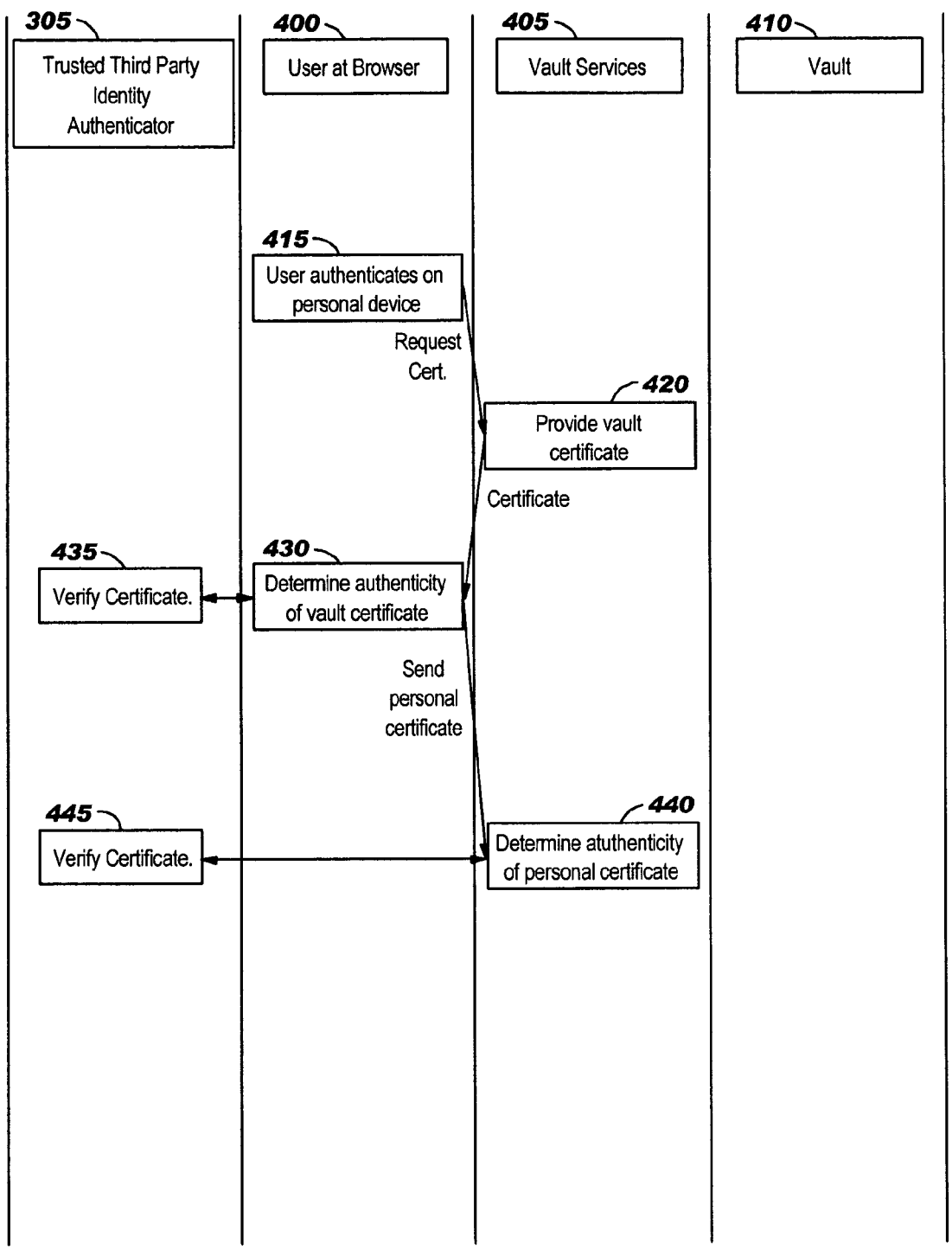
FIG. 4 is a swim lane diagram of an embodiment showing steps of mutual party authentication.

FIG. 4 is a swim lane diagram of an embodiment showing steps of mutual party authentication, beginning at step 415. Four lanes are shown including a lane for the trusted third party identity authenticator 305, a lane for a user (typically at a browser) 400, a lane for vault services 405, and a lane for the vault 410. At step 415, the user authenticates themselves on a personal device such as a biometric device and requests a certificate from the vault services via a browser or other technique.

At step 420, the vault service provides a certificate to the user. The certificate has identifying information of the information vault plus a signed hash from a trusted certificate authority (CA). A signature may be created by calculating a hash over the data using an algorithm that is one-way (i.e., the identifying information cannot be generated from the hash value). The signing entity encrypts the hash value with its private key. The encrypted data may be unencrypted using the public key.

At step 430, the user's PC receives the certificate and, at step 435, using a third party identity authenticator determines the authenticity of the certificate by calculating a hash over the information vault's certificate, decrypts the signed hash value from the CA and compares the resulting two values to verify the certificate. Equal values indicate that the information vault is actually the information vault. Thus, the information vault is authenticated from the user's perspective.

At step 440, the vault services receives the user's personal certificate and, at step 445, the authenticity of the user's personal certificate is determined in a like manner as the vault certificate and is authenticated by verifying the personal certificate. Thus, the personal certificate is authenticated by the third party authenticator and returned to the vault services. After this, the user's machine encrypts all traffic to the information vault using the information vault's public key, and the information vault encrypts data to the user with the user's public key. A secure transport such as secured socket layer (SSL) communication may be employed by the vault services.

Figure 5:
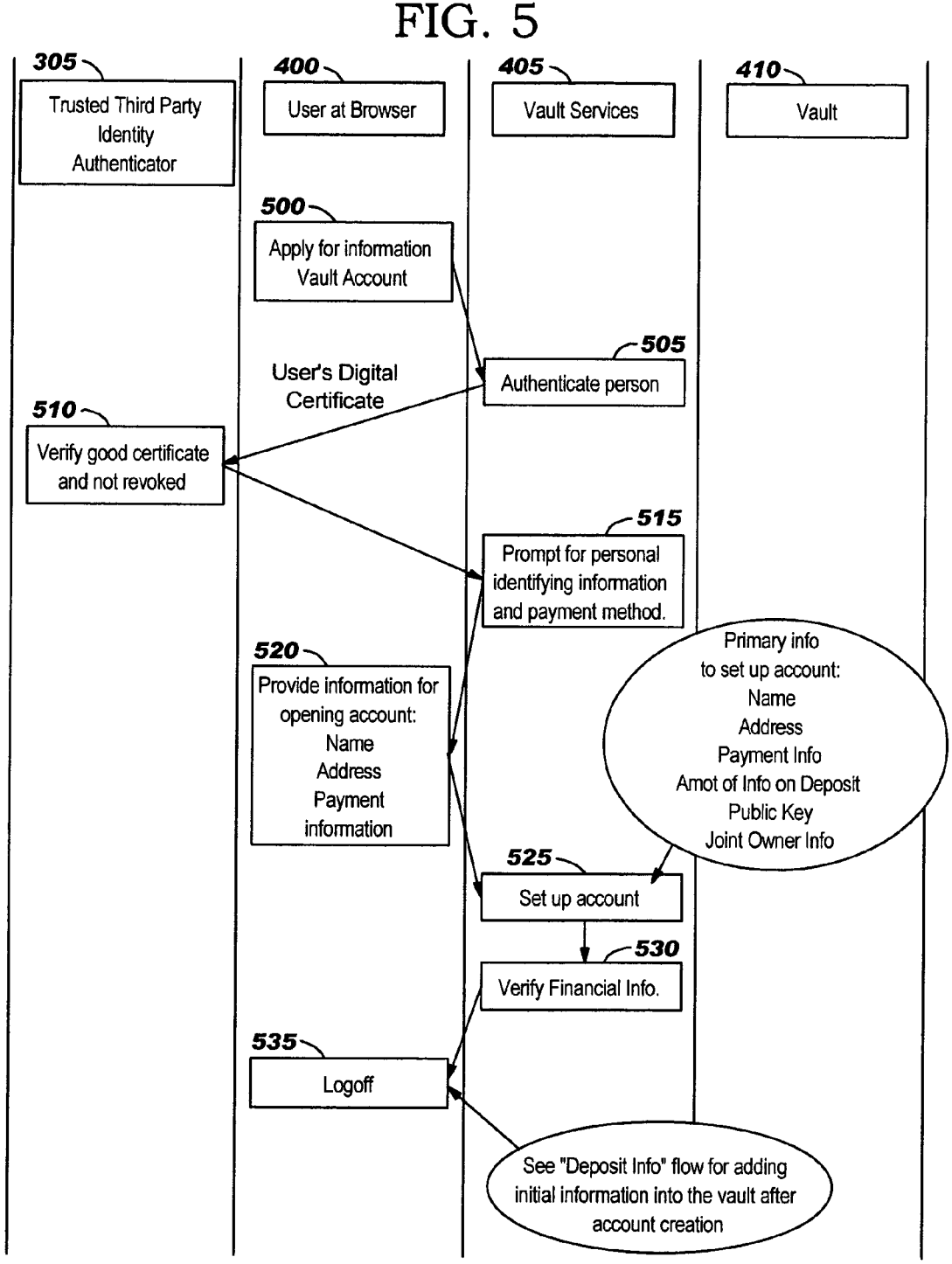
FIG. 5 is a swim lane diagram of an embodiment showing steps of creating an account.

FIG. 5 is a swim lane diagram of an embodiment showing steps of creating an account. At step 500, the user chooses to apply for an information vault account and access the information vault services supplying a personal digital certificate. At step, 505, the vault services determine the authenticity of the applicant/user, and, at step 510, using the third party authenticator, verifies the applicant's certificate. At step 515, the vault services prompt the user for personal and payment information. At step 520, the user/applicant provides information for opening an account such as name, address, date of birth, social security number, payment information, joint account information, or the like. At step 525, the vault services gather any demographic data and certificate public key to establish the applicant's account. Optionally, at step 530, the applicant's financial data is verified. At step 535, the account is established and the user/applicant may log off.

Figure 6:
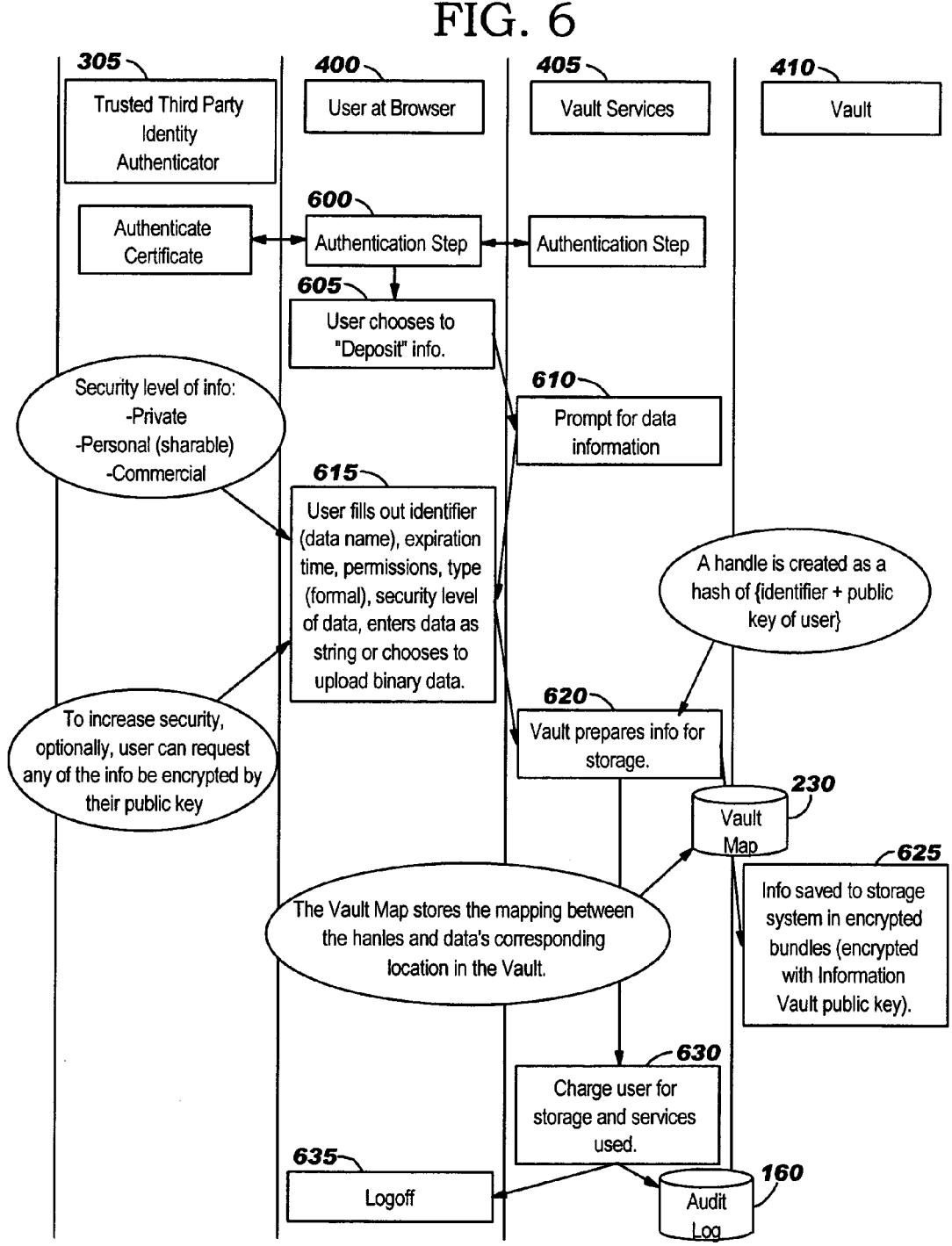
FIG. 6 is a swim lane diagram of an embodiment showing steps of depositing information into a user account.

FIG. 6 is a swim lane diagram of an embodiment showing steps of depositing information into a user account, beginning at step 600 where the user and vault services mutually authenticate one another (e.g., the process of FIG. 4). At step 605, the user may choose to deposit an item of information at the information vault. At step 610, a prompt is issued by the vault services for identifying the information (user created or pre-generated) such as permissions, expiration time, the security level (e.g., open, secure, anonymous/lock box). The user's device encrypts the information with public key of the information vault which ensures that only the vault may read the information. The information may be transmitted to the information vault.

At step 615, the user enters data or chooses to upload binary data. E.g., the user may add a string of data or a binary file (binary can be any information, including, for example, a text file or video). The string data may include descriptive information about the information item and may describe the format of the information item itself. For private information, this field may optionally be used by the depositor to specify data format. For sharable information, the field may be set by the depositor and may be used to specify a pre-negotiated format identifier or set to a standard XML format. For commercial information, the depositor may select the type of commercial information to deposit, the associated Commercial Data Formatter (CDF) applet may be instantiated and the CDF sets the data type field accordingly. This string field is part of the descriptive information about the information item. It defines the access possibilities of the information item. At a minimum it can be set to: "Private", "Sharable", and "Commercial". The settings may have the following definitions in embodiments:

(i) Private: Only the information owner or joint owner may retrieve or remove the information item.

(ii) Sharable: The owner or joint owner may access the information item directly or a third party may access the item providing the third party has possession of an information contract for that item.

(iii) Commercial: The owner or joint owner may access the information item directly or a third party may access the item providing the third party is typically willing to pay a fee for the item.

At step 620, the vault services may use a one way hash algorithm to determine a hash location for the information. That is, the information may be stored on servers using a hash mechanism to create a unique identifier (handle) of the information (public key+information identifier), which may be used as the storage point for the information and remembered in the vault map 230. The information may be stored encrypted when creating a user account and may be encrypted with the information vault's public key. For open or secure security levels, the information may have metadata identifying the owner, permissions, etc. This allows the information vault to retrieve the information more easily at a later time. At step 625, the information may be saved to a storage system in encrypted bundles. A vault map may store the mapping between the handles and the data's corresponding location in the vault. At step 630, a charge may be applied to the user for the storage and use of the vault services. An audit log may be kept of the transaction. At step 635, the user may log off.

Figure 7:
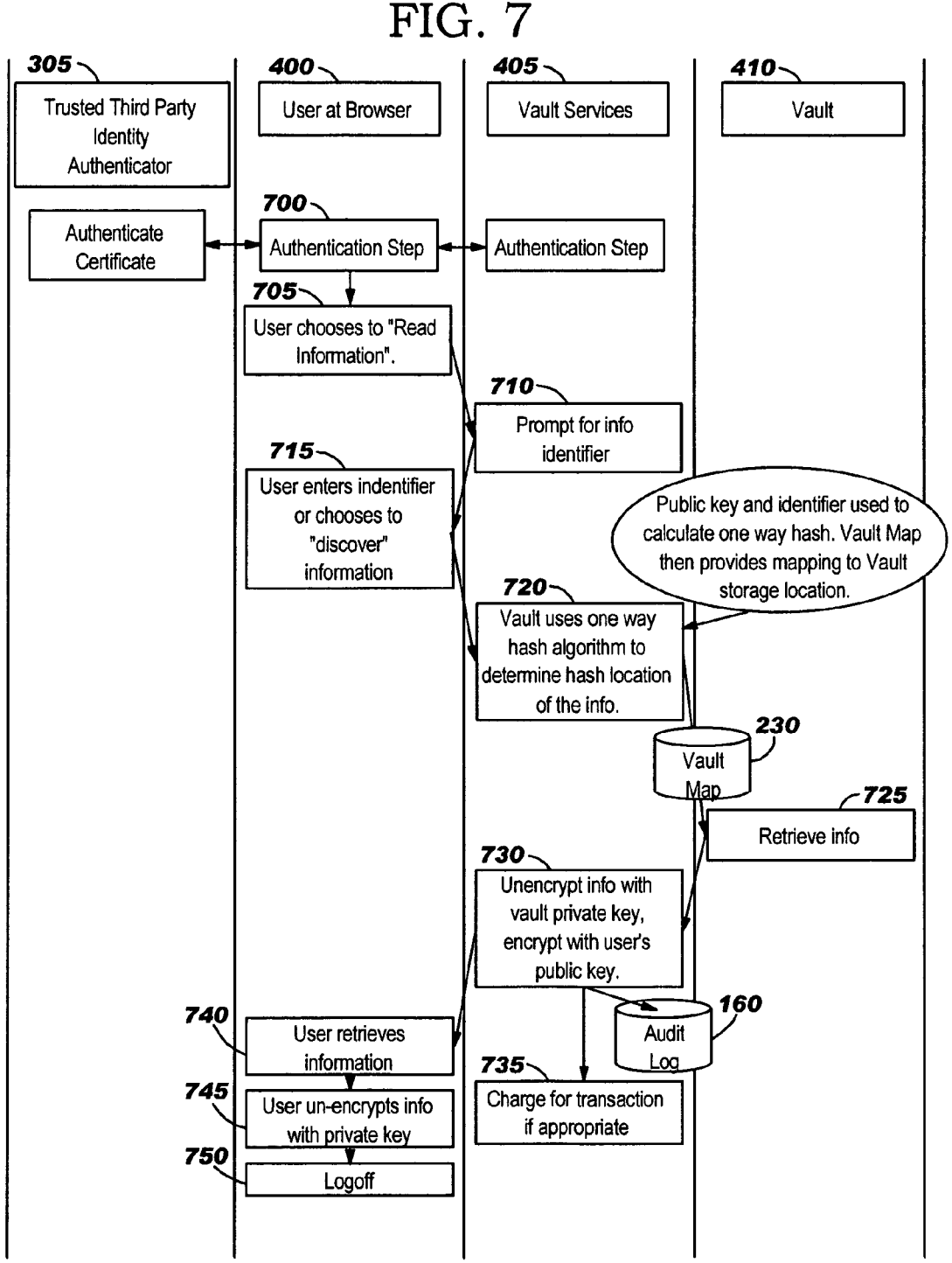
FIG. 7 is a swim lane diagram of an embodiment showing steps of reading information from an account.

FIG. 7 is a swim lane diagram of an embodiment showing steps of reading information from an account, beginning at step 700 where the user and vault services mutually authenticate one another (e.g., process of FIG. 4). At step 705 a user chooses to get/read information from the vault and accesses the vault services using a browser, for example. At step 710, a prompt is issued by the vault services for an information identifier. At step 715, the user may enter an identifier, choose a preset identifier, or choose to "discover" any open or secure items in the information vault associated with the identifier. One way that the discovery process may work is for the system to determine all combinations of the user's public key and identifiers. Any resulting has locations that have an open or secure item would be returned. At step 720, the vault service may use a one way hash algorithm to determine the location of the information employing the user's public key. At step 725, using the vault map, the information is retrieved by the information vault services from the vault.

At step 730, the information is decrypted with the vault's private key and encrypted with the user's public key. At step 735, a charge may be assessed for the transaction, if appropriate. An audit log entry may also be created. At step 740, the user retrieves the information. At step 745, the user decrypts the information with a private key and at step 750, the user may log off.

Figure 8:
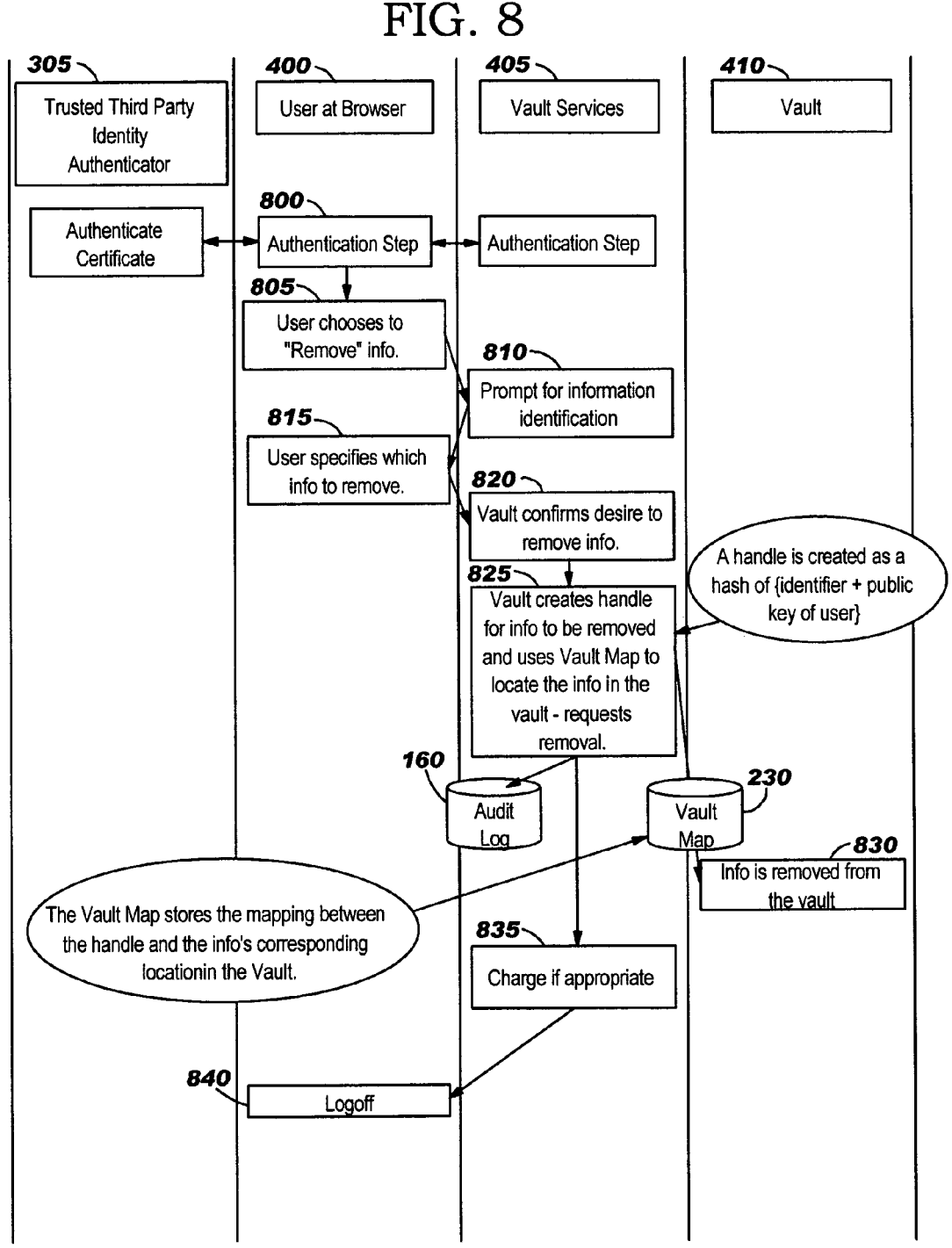
FIG. 8 is a swim lane diagram of an embodiment showing steps of removing information from a user account.

FIG. 8 is a swim lane diagram of an embodiment showing steps of removing information from a user account, beginning at step 800 where the user and vault services mutually authenticate one another (e.g., process of FIG. 4). At step 805, the user may choose to "remove" information from the vault by accessing vault services. At step 810, the vault services prompt for identification information from the user. At step 815, the user specifies which information to remove which may be an identifier, or choose to "discover" any open/secure items in the information vault.

At step 820, the vault services confirm the request to remove information. At step 825, the vault services use the public key of the user and identifier to create a hash value to access the vault map to find the information and request removal of the information. At step 830, the information is deleted from the vault. An audit log may be entered recording the removal. At step 835, a charge is created as appropriate for the removal activity. At step 840, the user may log off.

Figure 9:
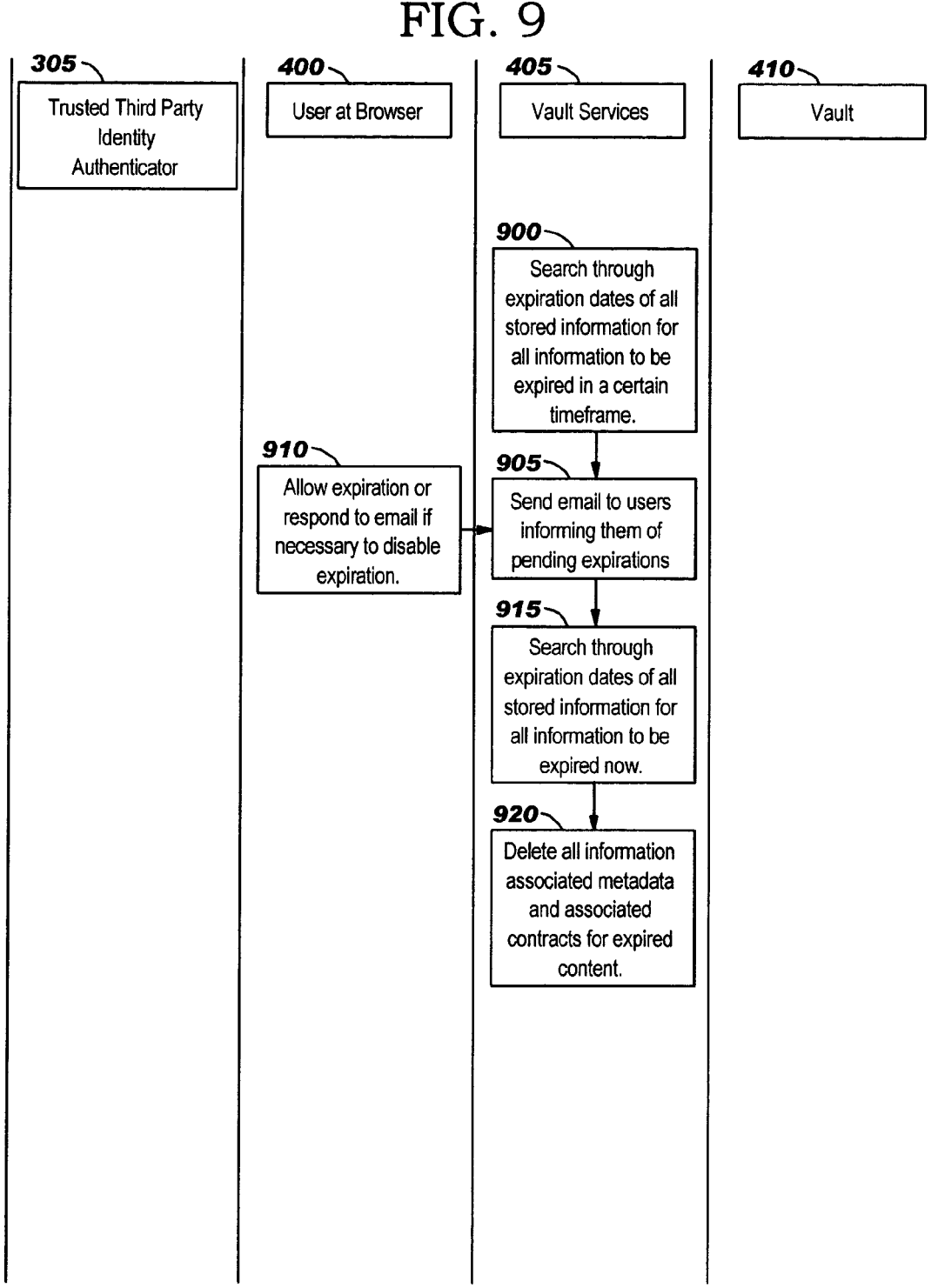
FIG. 9 is a swim lane diagram of an embodiment showing steps of expiring information from a user account.

FIG. 9 is a swim lane diagram of an embodiment showing steps of expiring information from a user account. At step 900, the vault services periodically (e.g., on a pre-determined schedule such as daily, monthly or other time basis) or continuously as a background activity, searches through the expiration dates of stored information for all information to be expired in a certain time frame. At a pre-determined time (e.g., a week, month, or similar time basis) prior to the actual expiration, users may be notified of any pending expirations. This notification may typically be an email notification or similar communication. At step 910, the user may respond to the notification in order to disable or reset the expiration, or may allow the expiration to occur by not responding. At step 915, the vault services locate all information that is scheduled to currently be expired at the pre-determined time. At step 920, at the pre-determined time, all information scheduled for expiration is deleted along with any associated metadata and contracts. The process may continue at step 900.

Figure 10:
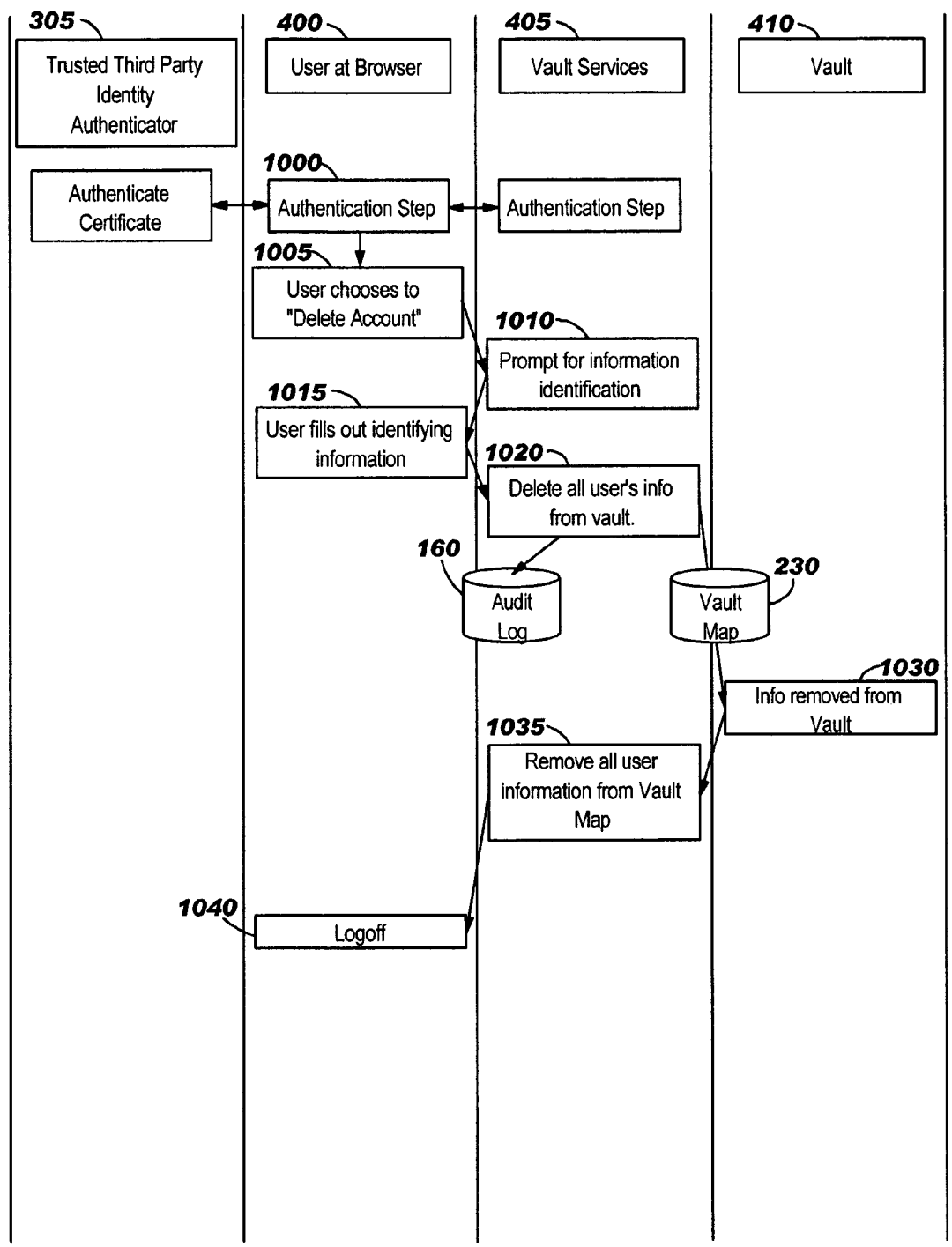
FIG. 10 is a swim lane diagram of an embodiment showing steps of deleting a user account.

FIG. 10 is a swim lane diagram of an embodiment showing steps of deleting a user account, beginning at step 1000 where the user 400 and vault services 405 mutually authenticate one another (e.g., process of FIG. 4). At step 1005, a user may choose an account to delete. At step 1010, the vault services prompt for identification information. At step 1015, the user enters identifying information of the account. At step 1020, the vault may re-affirm the account deletion and if the user affirms the deletion, a hash is computed to determine where the information resides using the vault map. An audit log may also be entered to record the activity. At step 1030, all stored information associated with the specified user account may be removed and all contracts with the user's information as associated with the account may be removed. Any demographic data and financial information may also be removed as associated with the account. At step 1035, all user information associated with the account may be deleted from the vault map. At step 1040, the user may log off.

Figure 11:
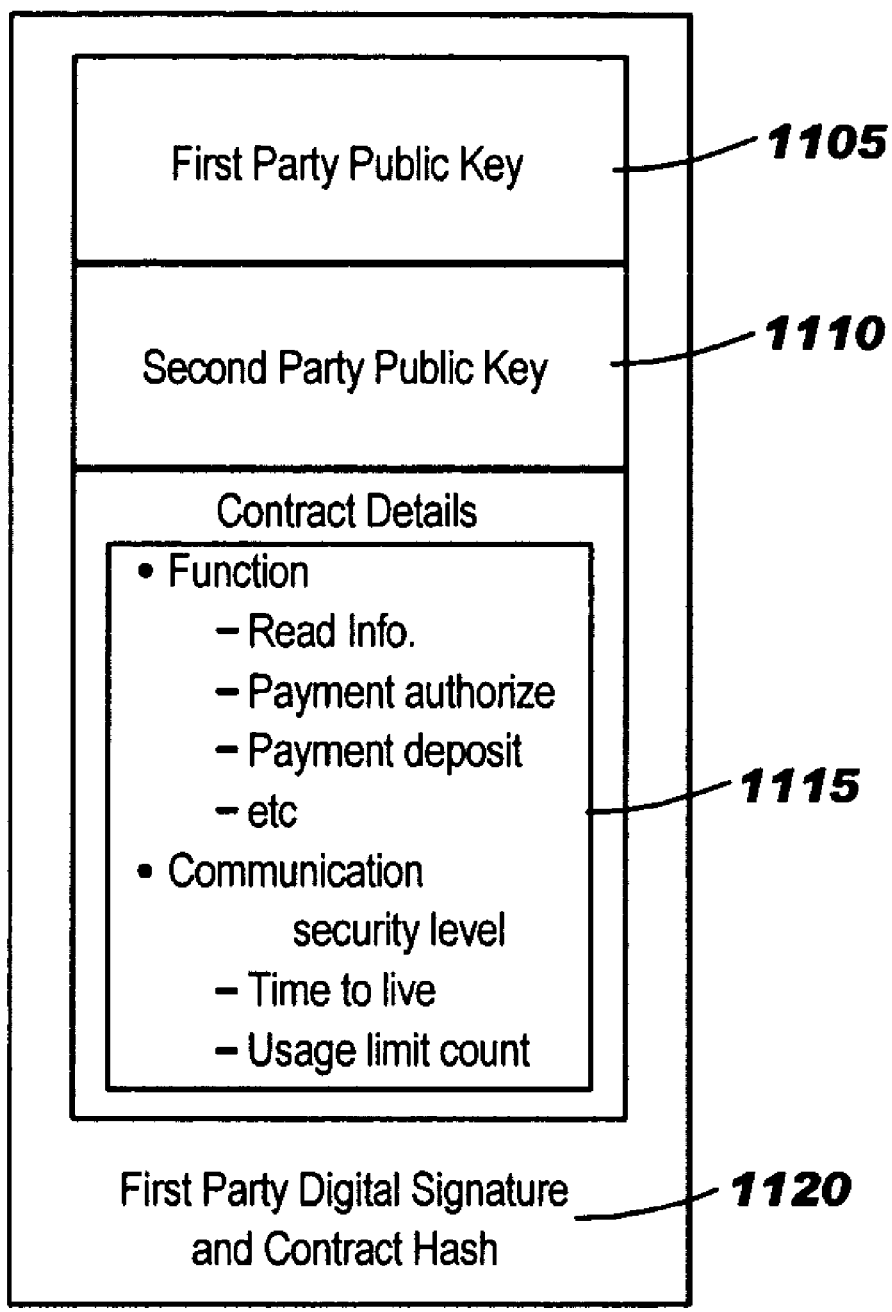
FIG. 11 is an illustrative diagram of an embodiment of a second party contract.

FIG. 11 is an illustrative diagram of an embodiment of a second party contract, generally denoted by reference numeral 1100. Second party access to user information may be controlled via the "contract" mechanism of this system. The contract 1100 is typically a data structure that may be created by the first party and given to the second party as a contract token that may be honored by the information vault 100. The contract 1100 may contain information identifying the two party entities and the functional exchange agreed by the contract. For example, the contract may define whether a phone number or an address may be given to a second party. Or, the contract may allow the vault to perform other services on behalf of the parties.

The information vault executes the required functional exchange after authenticating the integrity of the contract token and that the service requester is indeed the second party as called out in the contract. The contract defines the agreement between the first and second party. The information vault 100 typically executes this contract as the trusted third party. This contract 1100 may be held by the second party or deposited in the information vault 100. The contract 1100 is digitally hashed and signed by the first party's private key, generally denoted by reference numeral 1120. This allows the information vault 100 to ensure that the contract 1100 has not been altered since creation.

The contract 1100 also includes the first party public key 1105, the second party public key 1110, and contract details 1115. The contract details 1115 may include the agreed upon function(s) which may be read information, payment authorization, payment deposit, or similar information. The contract details 1115 may further include the communication security level, the time to live (e.g., an expiration date), and a usage limit count to control the number of times transactions may occur.

Figure 12:
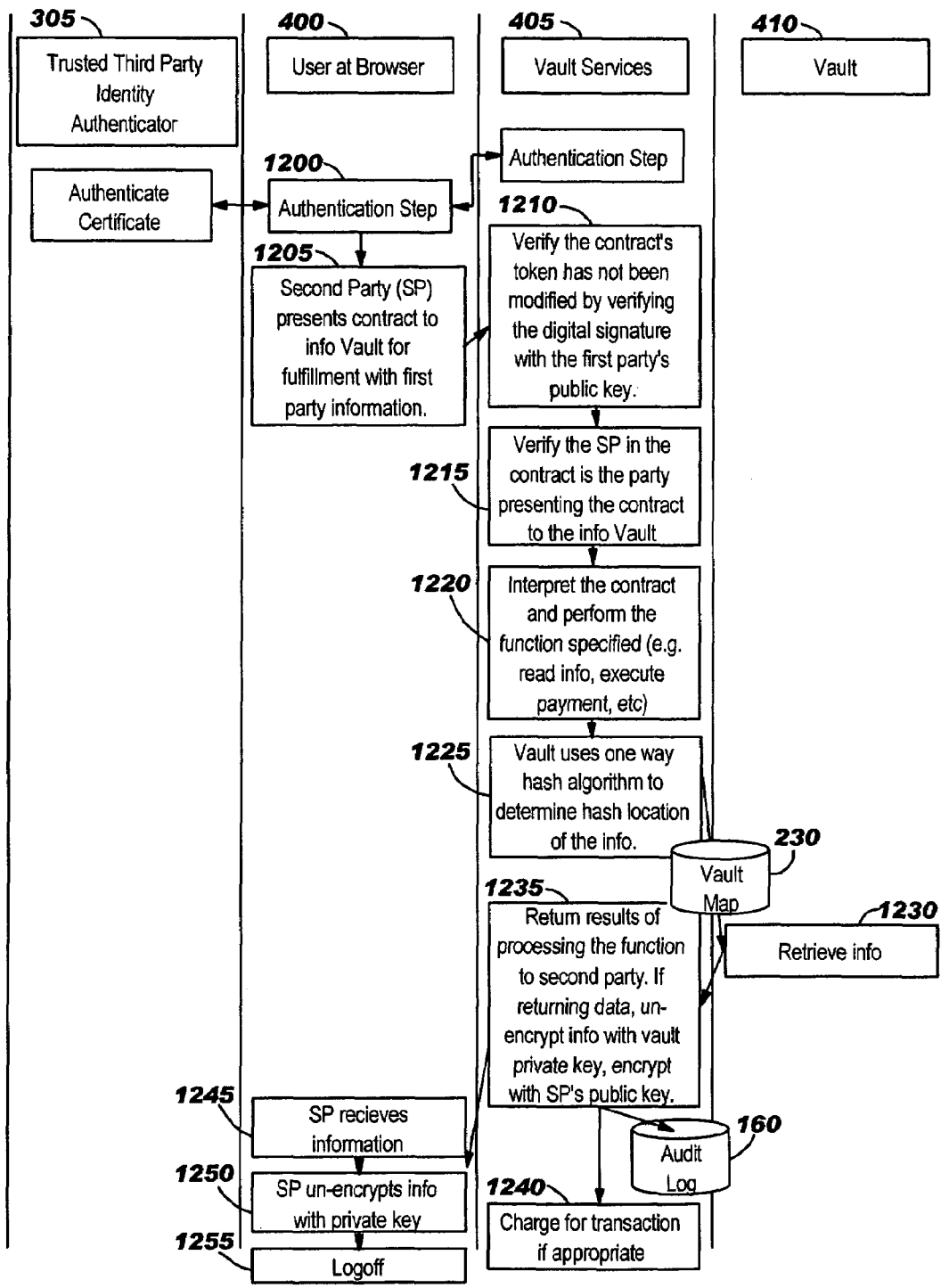
FIG. 12 is a swim lane diagram of an embodiment showing steps of a second party contract fulfillment.

FIG. 12 is a swim lane diagram of an embodiment showing steps of a second party contract fulfillment, beginning at step 1202, where the second party 1200 and vault services 405 mutually authenticate one another (e.g., via the process of FIG. 4). At step 1205, a second party presents a contract 1100 to the information vault 100 for fulfillment. At step 1210, the vault services verify that the contract's token has not been modified by verifying the digital signature with the first party's public key. At step 1215, the vault services verify that the second party in the contract is the party presenting the contract to the information vault. At step 1220, the contract may be interpreted and the functions specified in the contract details executed. At step 1225, the vault services use a one way hash and the vault map to locate the associated information in the vault.

At step 1230, the information is retrieved from the vault. At step 1235, any results of processing the functions of the contract are returned to the second party. Any data to be returned may be decrypted using the vault's private key and may be re-encrypted with the second party's public key. An entry into the audit log may also be made to record the access. At step 1240, any appropriate charge may be made for the transaction. At step 1245, the second party receives the information. At step 1250, the second party decrypts the information using the second party private key. At step 1255, the second party may log off.

Figure 13:
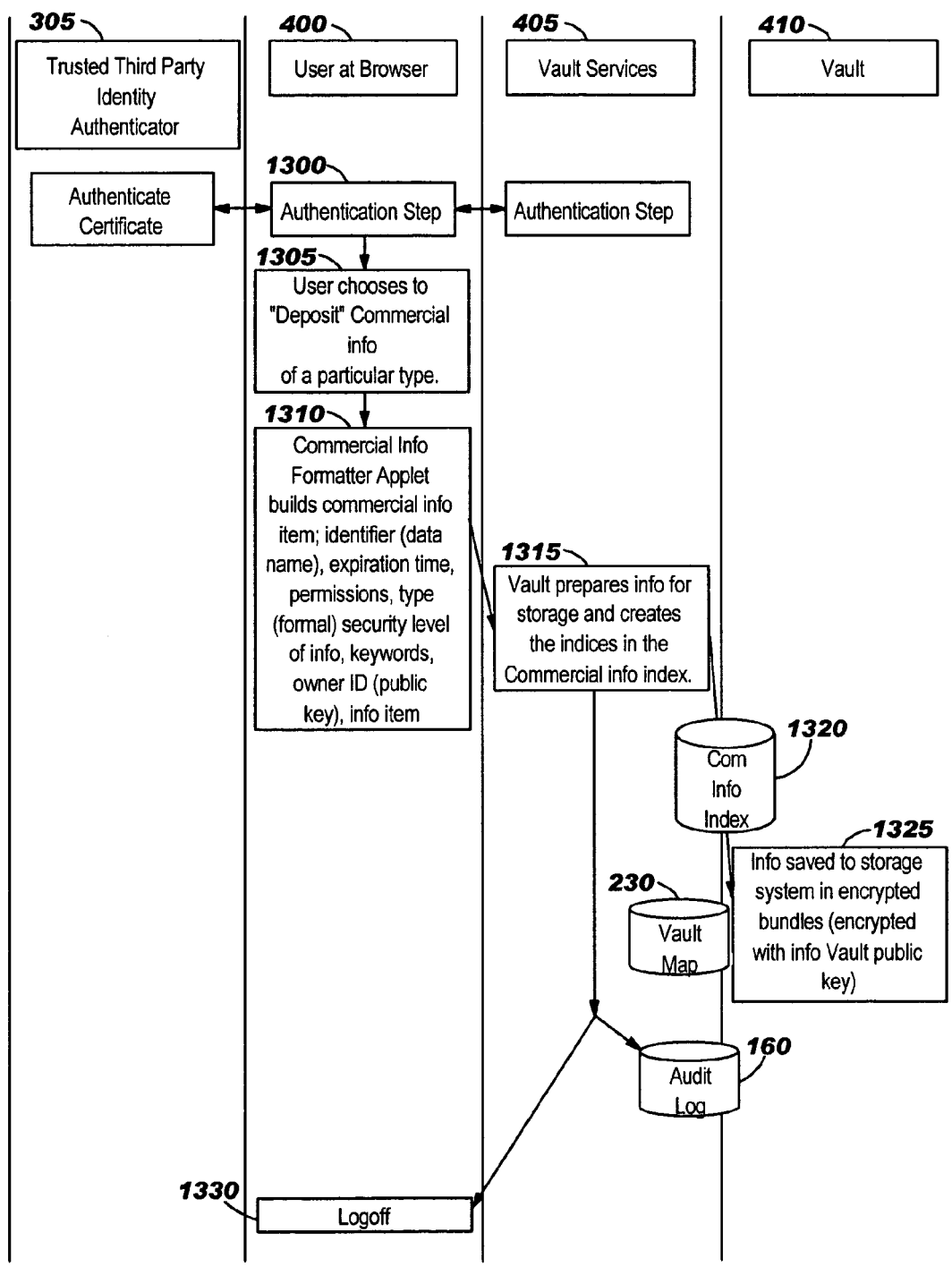
FIG. 13 is a swim lane diagram of an embodiment showing steps of commercial information deposit.

FIG. 13 is a swim lane diagram of an embodiment showing steps of commercial information deposit, beginning at step 1300 where the user 400 and vault services 405 mutually authenticate one another (e.g., via process of FIG. 4). At step 1305, the user chooses to "deposit" commercial information of a particular type into the vault. At step 1310, the user may employ a commercial data formatter applet (CDFA), typically downloaded to a user's computer, to build a commercial information item. The CDFA, when instantiated on the user's computer, guides the user to enter the appropriate information including any descriptive indexing information. The CDFA may prompt for an identifier (data name), expiration time, permissions, type (format), security level, keywords, owner ID (e.g., public key) and may confirm the information with the user and deposits the commercial information with the vault services.

At step 1315, the vault services prepare the commercial information for storage and create the indices into a commercial information index 1320 and create a handle for the information. At step 1325, the commercial information is physically stored in the vault with the vault map updated with the mapping of the information item handle to physical storage reference. The indexing information obtained during the commercial data formatting step and the information item handle may be stored in the commercial information index 1320. This set of tables may map the obtained indices to the commercial information item handle. The storing of the item in the vault, updating the vault map and the updating of the commercial information index is typically one unit of work. At step 1330, an acknowledgement of success may be passed back to the user at the browser and the user may then log off. In this way, the vault may store data on behalf of a first party that may be of interest to second party and made accessible to the second party (e.g., a business). The commercial index facilitates access to this data.

Figure 14:
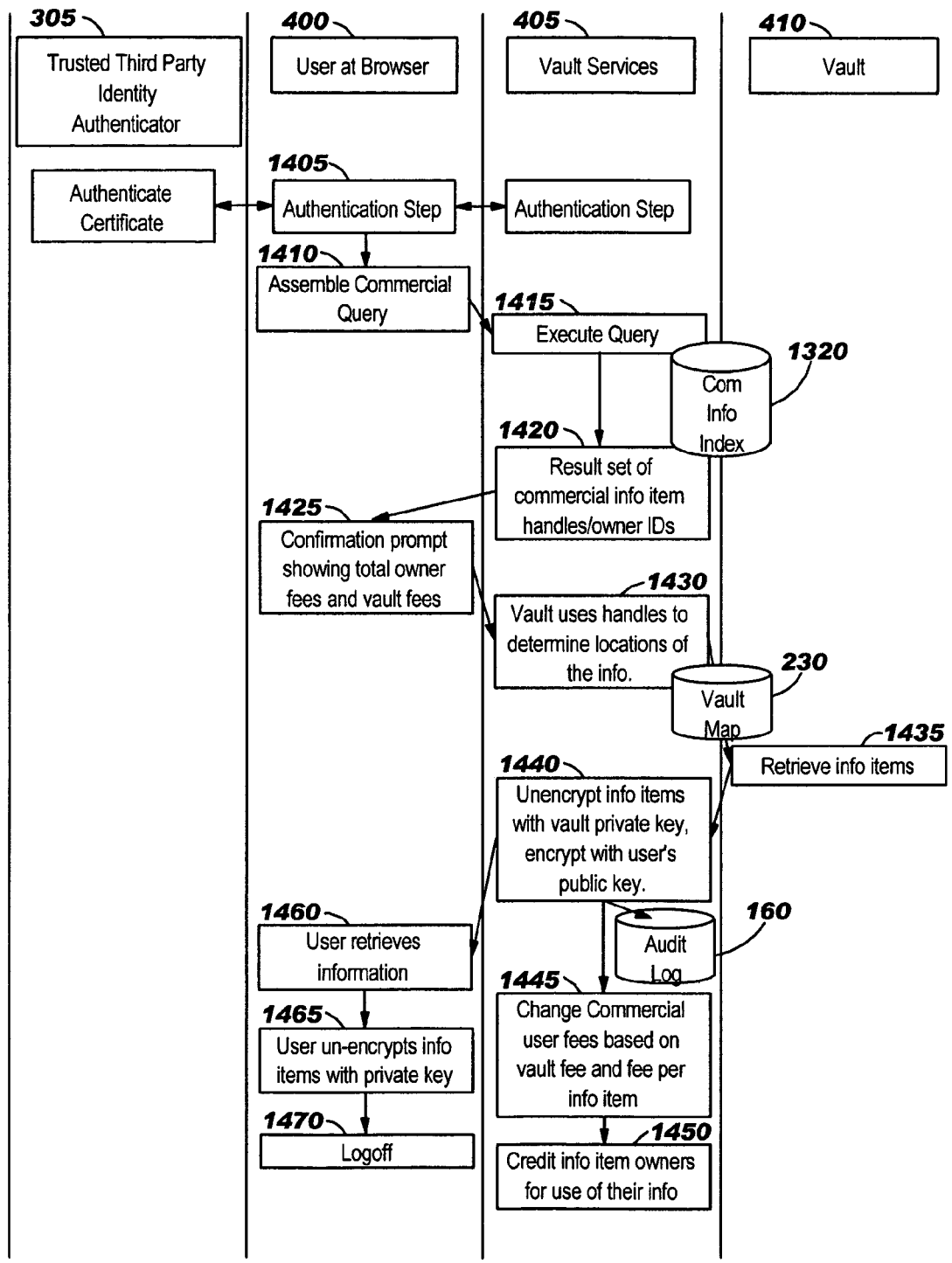
FIG. 14 is a swim lane diagram of an embodiment showing steps of commercial access to first party information.

FIG. 14 is a swim lane diagram of an embodiment showing steps of commercial access to first party information, beginning at step 1405 where the commercial second party 1400 and vault services 405 mutually authenticate one another (e.g., via process of FIG. 4). At step 1410, a commercial second party chooses to perform a query of the commercial information of a particular type. A query applet may be provided and instantiated for use by the second party commercial user. At step 1415, the query may be passed to the vault services by the query applet where the query may be executed using the commercial information index 1320.

At step 1420, the result set that meet the query criteria typically includes commercial information item handles and/or owner IDs. At step 1425, a confirmation prompt may be presented to the commercial user that may include an indication of the number of hits and actual cost to the commercial user. The fee structure may be based on fees to the vault and per item fees to the owners of the information.

At step 1430, the vault services use the handles to determine the locations of the information via the vault map 230. At step 1435, if the user chooses to proceed, the vault services retrieve the information from the vault. At step 1440, information items are decrypted using the vault's private key and re-encrypted using the commercial user's public key and returned to the commercial user. An audit log entry may be entered recording the facts of the transaction. At step 1445, any appropriate charges to the commercial user based on vault fees and/or per item fees may be made, perhaps through the vaults financial backend interface to a bank, or the like.

At step 1450, credit to the information owner may be made for use of the information. This amount may vary significantly depending on the particular information "sold" and/or fee schedules. These fees may accumulate until a threshold is met and then the account balances may be applied to the owner. At step 1460, the commercial user retrieves the information and, at step, 1465, the commercial user decrypts the information items using a private key. At step 1470, the commercial user may log off.

While the invention has been described in terms of embodiments, those skilled in the art will recognize that the invention can be practiced with modifications and in the spirit and scope of the appended claims.

What is claimed is:

1. A secure information repository system, comprising:
    a trusted third party having data storage for securely storing encrypted information, associated with an account holder;
    a deposit system for securely depositing encrypted information into the data storage by the account holder;
    a system structured and arranged to allow the account holder to designate information provided by the account holder to the trusted third party as private, shareable, and commercial, wherein:
        the private information is information accessible to the account holder but not to a second party;
        the sharable information is information accessible to the account holder and the second party as provided by contract; and
        the commercial information is information accessible to the account holder and the second party when the second party pays a fee for the commercial information;
    a system of the trusted third party for allowing the account holder to provide permission to the second party to read an agreed upon set of personal information;
    an information access system for accessing the encrypted information stored in the data storage;
    an information withdrawal system for removing the encrypted information stored in the data storage; and
    a tracking system for logging at least any one of a deposit to the data storage, a withdrawal from the data storage, a deletion to the data storage, an account creation, an account deletion, and an access to the data storage,
    wherein the account holder is an owner of personal data and the system allows the owner of personal data to control and manage access and dissemination of the personal data such that the trusted third party prevents the second party from seeing designated personal information and makes available to the second party designated information of the account holder.

2. The system of claim 1, wherein the data storage, the deposit system, the information access system, and the information withdrawal system are services of an information vault and each service accessible via a network.

3. The system of claim 1, wherein the deposit system, the information access system and the information withdrawal system use a dual key security mechanism to authenticate a transaction.

4. The system of claim 1, further comprising a charging system for charging a user for at least any one of a deposit of information into the information vault, a withdrawal of information from the information vault, and an access to information in the data storage.

5. The system of claim 1, wherein the data storage stores personal information associated with the account holder including at least any one of a credit card information, a demographic information, a medical record, a user identification information, an age, a date of birth, an address, and a financial information.

6. The system of claim 1, wherein the deposit system provides for a user to identify an item of information with a handle and associate the item of information with an account, the item of information being encrypted with a private key associated with the user or account holder and the item is identified as being one of sharable, commercial, and private.

7. The system of claim 1, wherein the information access system provides for a user to access an item of information identified by a handle.

8. The system of claim 7, wherein the user is other than the account holder and the user gains access to the item of information via a contract, wherein the contract specifies at least the account holder's public key, the user's public key, and contract details.

9. The system of claim 8, wherein the contract is digitally signed by the user by hashing the contract using a private key of the user and encrypting a result of the hashing.

10. The system of claim 9, wherein the contract defines access restriction to the item of information to entities specified in the contract.

11. The system of claim 1, further comprising a contract data token that specifies the account holder as a first party and the second party, the second party being another user given access to the encrypted information by the first party.

12. The system of claim 11, wherein the contract data token is provided to the second party for accessing the encrypted information and controls the functions that the second party may perform with the encrypted information.

13. The system of claim 11, wherein the contract data token is digitally signed and encrypted with a private key of the first party.

14. The system of claim 12, wherein the contract data token is authenticated by one of the information access system and information withdrawal system when the second party presents the contract data token for accessing the at least one item of first party information.

15. A system for providing a protected information repository, comprising:
    a trusted third party having an information vault having data storage comprising:
        a system structured and arranged to allow an account holder to designate information provided by the account holder to the trusted third party as private, shareable, and commercial, wherein:
            the private information is information accessible to the account holder but not to a second party;
            the sharable information is information accessible to the account holder and the second party as provided by contract; and the commercial information is information accessible to the account holder and the second party when the second party pays a fee for the commercial information;
a system configured to securely create an account for the account holder in the information vault;
a system configured to securely delete information in the information vault;
a system configured to allow the account holder to provide permission to the second party to read an agreed upon set of personal information;
a system configured to access information in the information vault; and
a system configured to charge for transactional activity involving the information,
wherein the system for providing a protected information repository allows the account holder to control and manage access and dissemination of the personal information such that the trusted third party prevents the second party from seeing designated personal information and makes available to the second party designated information of the account holder.

16. The system of claim 15, further comprising:
a system configured to create a digital certificate;
a system configured to track transactional activity with the information vault; and
a system configured to mutually authenticate parties using the digital certificate during a transaction with the information vault.

17. The system of claim 15, further comprising:
a system configured to expire information associated with the account in the information vault;
a system configured to remove information from the account;
a system configured to read information from the account; and
a system configured to delete the account.

18. The system of claim 15, further comprising:
a system configured to create a second party contract;
a second party contract fulfillment system;
a commercial information deposit system; and
a system configured to provide commercial access to the commercial information.

19. A method of providing an information repository, comprising:
accessing an information vault of a trusted third party to perform a transaction involving a secured item of information stored in the information vault;
providing a system structured and arranged to allow an account holder to designate information provided by the account holder to the trusted third party as private, shareable, and commercial, wherein:
the private information is information accessible to the account holder but not to a second party;
the sharable information is information accessible to the account holder and the second party as provided by contract; and
the commercial information is information accessible to the account holder and the second party when the second party pays a fee for the commercial information;
authenticating an identity of the second party;
executing the transaction on computer infrastructure when the identity of the second party is authenticated; and
logging the transaction,
wherein the method allows the account holder, who is an owner of personal data, to control and manage access and dissemination of the personal information such that the trusted third party prevents the second party from seeing designated personal information and makes available to the second party designated information of the owner of personal information.

20. The method of claim 19, further comprising charging a fee for the transaction.

21. The method of claim 20, wherein at least a portion of the fee is remitted to the owner of personal information.

22. The method of claim 19, further comprising creating a digital certificate for use in authenticating the identity of the entity.

23. The method of claim 19, further comprising:
creating a digital certificate for an applicant associated with the secured item of information and authenticating the applicant using a witness and third party identity authenticator; and
accessing the information vault to create an account associated with the applicant and presenting the digital certificate as identity.

24. The method of claim 19, wherein the authenticating authenticates using a trusted third party authenticator.

25. The method of claim 19, wherein the accessing includes at least any one of depositing the item of information, reading the item of information, removing the item of information, deleting an account, depositing commercial information, and querying commercial information.

26. The method of claim 25, wherein the deleting account includes removing all user information from an information vault map.

27. The method of claim 19, further comprising:
searching the contents of the information vault for information for information about to expire;
notifying an owner of the information about to expire; and
when the owner permits the information to expire, deleting all information, associated metadata, and associated contracts for the information that has expired.

28. The method of claim 19, further comprising:
verifying a contract token by validating the digital signature of the contract token;
verifying that the second party is the second party as specified by the contract token;
performing the functions as specified by the contract token; and
returning any results of the performed functions to the second party completing the transaction.

29. The method of claim 28, wherein when the any results is data, the any results is decrypted with the information vault's private key and re-encrypted with the second party's public key.

30. The method of claim 29, further comprising decrypting the any results using the second party'private key.

31. The method of claim 19, wherein the accessing is a deposit of commercial information by an owner of the commercial information and the secured item of information is an item of commercial information, wherein the commercial information item has at least any one of an expiration time, an identifier, a permission, a format type, a security level, one or more keywords and an owner ID.

32. The method of claim 31 further comprising building a commercial information index.

33. A method of charging for personal information comprising:
depositing personal data by an owner into an information vault of computer infrastructure of a trusted third party;
providing a system structured and arranged to allow the owner to open an account and become an account holder, wherein the account holder can designate information provided by the account holder to the trusted third party as private, shareable, and commercial, wherein:

the private information is information accessible to the account holder but not to a second party;

the sharable information is information accessible to the account holder and the second party as provided by contract; and the commercial information is information accessible to the account holder and the second party when the second party pays a fee for the commercial information;

establishing a contract with the second party and the owner to enable access to the personal data by the at least one entity;

allowing via the trusted third party the owner of personal data to provide permission to the second party to read an agreed upon set of personal data;

accessing the personal data by the second party according to terms of the contract;

preventing the second party from seeing designated personal data and making available to the second party designated data of the owner of personal data;

charging a fee to the second party for accessing the designated personal data of the owner of the personal data; and remitting at least a portion of the fee to the owner of the personal data.

34. The method of claim 33, wherein the personal data is encrypted using the owner's public key.

35. The method of claim 33, wherein the accessing step includes authenticating at least the at least one entity.

36. The method of claim 33, wherein the establishing the contract includes authenticating the identity of the owner and the identity of the second party, and specifying terms of the contract, the terms defining functions that the second party can perform with the personal data.

37. The method of claim 33, wherein the information vault authenticates the owner and the second party.

38. The method of claim 33, wherein the depositing provides for the owner to encrypt the personal data with a private key associated with the owner.

39. A computer program product comprising a computer usable medium having readable program code embodied in the medium, the computer program product includes at least one component to:

allow an owner of personal data to control and manage, via the internet, access and dissemination of the personal data wherein the owner of personal data provides permission to an entity to read an agreed upon set of personal data;

preventing the entity from seeing designated personal data and making available to the entity a secured item of personal data stored in the information vault;

access an information vault of a trusted third party to perform a transaction involving the secured item of personal data stored in the information vault;

authenticate an identity of the entity performing the accessing;

execute the transaction when the identity of the entity is authenticated; and log the transaction, wherein the computer program product is implemented with a system structured and arranged to allow the owner to open an account and become an account holder, wherein the account holder can designate information provided by the account holder to the trusted third party as private, shareable, and commercial, wherein:

the private information is information accessible to the account holder but not to the entity;

the sharable information is information accessible to the account holder and the entity as provided by contract; and the commercial information is information accessible to the account holder and the entity when the entity pays a fee for the commercial information.

* * * * *

UNITED STATES PATENT AND TRADEMARK OFFICE
CERTIFICATE OF CORRECTION

PATENT NO. : 7,587,366 B2  Page 1 of 1
APPLICATION NO. : 10/965592
DATED : September 8, 2009
INVENTOR(S) : Grim, III et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1015 days.

Signed and Sealed this

Twenty-first Day of September, 2010

David J. Kappos
*Director of the United States Patent and Trademark Office*